United States Patent
Goto et al.

(10) Patent No.: US 10,661,690 B2
(45) Date of Patent: May 26, 2020

(54) VEHICLE SEAT HAVING A RECESSED CENTRAL REGION OF THE SEAT PAD

(71) Applicant: TOYOTA BOSHOKU KABUSHIKI KAISHA, Aichi-ken (JP)

(72) Inventors: Yuki Goto, Aichi-ken (JP); Yoshihide Ito, Aichi-ken (JP); Shogo Ishii, Aichi-ken (JP); Akira Kaneko, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/155,329

(22) Filed: Oct. 9, 2018

(65) Prior Publication Data
US 2019/0106035 A1 Apr. 11, 2019

(30) Foreign Application Priority Data

Oct. 10, 2017 (JP) .................................. 2017-197005

(51) Int. Cl.
*B60N 2/64* (2006.01)
*B60N 2/58* (2006.01)

(52) U.S. Cl.
CPC ........... *B60N 2/646* (2013.01); *B60N 2/5825* (2013.01); *B60N 2/5883* (2013.01)

(58) Field of Classification Search
CPC ..... B60N 2/646; B60N 2/5825; B60N 2/5883
USPC ............... 297/452.25, 452.27, 452.26, 452.6
See application file for complete search history.

(56) References Cited

U.S. PATENT DOCUMENTS

| 4,975,135 | A | * | 12/1990 | Lowe | B29C 44/569 156/155 |
| 5,702,159 | A | * | 12/1997 | Matsuoka | A47C 7/18 297/452.48 |
| 5,944,389 | A | * | 8/1999 | Zenba | B60N 2/70 156/78 |
| 8,991,934 | B2 | * | 3/2015 | Sei | B60N 2/5825 297/452.59 |
| 2016/0039322 | A1 | | 2/2016 | Nakada et al. | |
| 2018/0022255 | A1 | * | 1/2018 | Abe | B60N 2/5883 297/452.58 |

FOREIGN PATENT DOCUMENTS

JP 2016-36350 3/2016

* cited by examiner

*Primary Examiner* — Milton Nelson, Jr.
(74) *Attorney, Agent, or Firm* — Greenblum & Bernstein, P.L.C.

(57) ABSTRACT

A vehicle seat including: a seat pad capable of elastically supporting an occupant, the seat pad having a seating portion that allows the occupant to seat on a front surface thereof, and the seating portion is divided in a seat width direction into a first region, a second region, and a central region formed between the first and the second region, the first region and the second region being capable of being concave-deformed toward a back surface of the seat pad opposite to the front surface when pressed by the occupant in a seating state, and in a free state where the seating portion is not pressed, a central region part in the central region arranged between the first and the second region that are to be concave-deformed has a shape concaved toward the back surface of the seat pad as compared to the first and the second region.

9 Claims, 7 Drawing Sheets

VEHICLE SEAT HAVING A RECESSED CENTRAL REGION OF THE SEAT PAD

CROSS-REFERENCE TO RELATED APPLICATIONS

This application claims priority from Japanese Patent Application No. 2017-197005 filed on Oct. 10, 2017, the entire contents of which are incorporated herein by reference.

TECHNICAL FIELD

The present disclosure relates to a vehicle seat including a seat pad capable of elastically supporting an occupant and having a seating portion of the seat pad that is partially concave-deformed when pressed by the occupant.

BACKGROUND

In a general vehicle seat, a seat pad capable of elastically supporting an occupant is arranged on a back surface of a seat cover constituting a design surface of the seat. For example, the cushion pad as disclosed in JP-A-2016-036350, which corresponds to the seat pad of the present disclosure, is a member having a substantially rectangular shape in a top view when seen from above, which is used as a seat cushion serving as a seat portion. A seating portion is disposed on the cushion pad so as to allow the occupant to seat, and an upper surface (seating surface) serving as a front surface of this seating portion is substantially flat in the left-right direction, i.e. the seat width direction, and in the front-rear direction. When the occupant sits on the seating portion, parts strongly pressed by buttocks of the occupant may occur separately on the left and the right of the seating portion (see FIG. 4 of JP-A-2016-036350).

Then, the technical field of vehicle seat requires to improve performances of a vehicle seat by improving seating performance, etc. of a seat pad. However, in a conventional cushion pad (seat pad), left and right parts of a seating portion are greatly concave-deformed when an occupant is sitting thereon, which is an unsuitable configuration from a viewpoint of seating performance improvement of the seat. Namely, concave-deformation of the left and right parts of the seating portion means that a part therebetween (a central part of the seating portion) relatively protrudes toward the occupant side. If the central part of the seating portion excessively protrudes toward the occupant side, such protruding part comes into contact with the occupant and becomes a reason for foreign body sensation, which may deteriorate seating performance of the seat.

SUMMARY

The present disclosure has been made in view of the above points, and a problem to be solved by the present disclosure is to avoid partial excessive protrusion of the seating portion toward an occupant as much as possible when a seat pad is pressed by the occupant, so as to improve performances of a vehicle seat.

An aspect of the present disclosure is a vehicle seat including: a seat pad capable of elastically supporting an occupant, the seat pad having a seating portion that allows the occupant to seat on a front surface thereof, and the seating portion is divided in a seat width direction into a first region, a second region, and a central region formed between the first region and the second region, both the first region and the second region being capable of being concave-deformed toward a back surface of the seat pad opposite to the front surface when pressed by the occupant in a seating state, and in a free state where the seating portion is not pressed, a central region part in the central region arranged between the first region and the second region that are to be concave-deformed has a shape concaved toward the back surface of the seat pad as compared to the first region and the second region.

DETAILED DESCRIPTION

Figure 5:
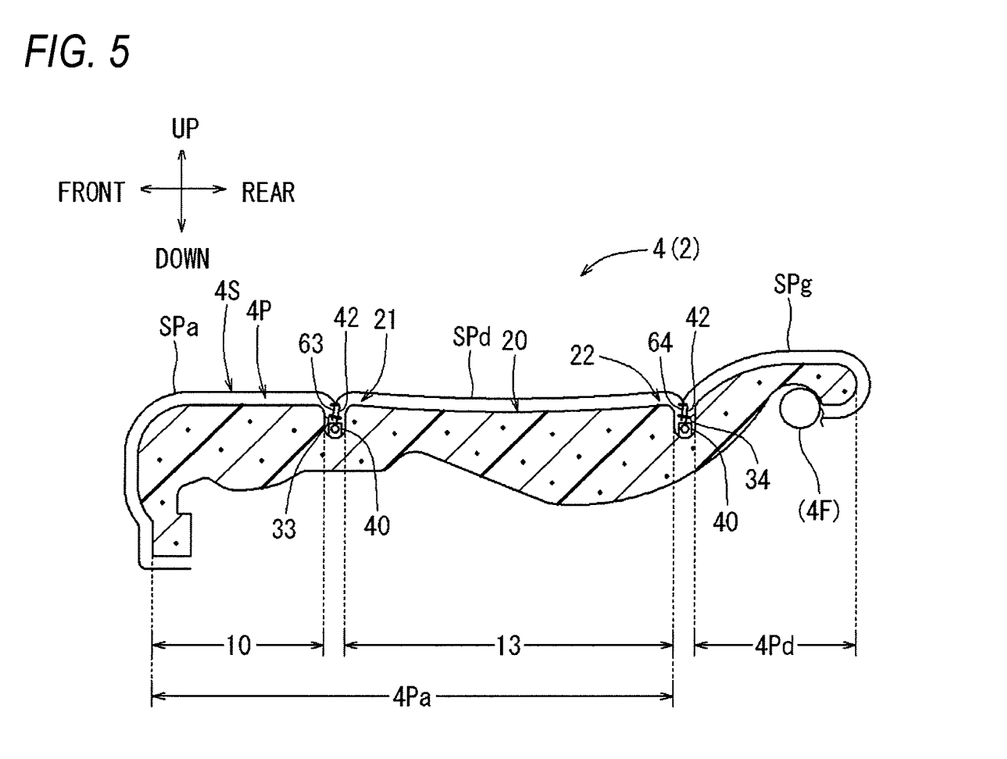
FIG. 5 is a schematic vertical cross-sectional view of a vehicle seat.
Figure 6:
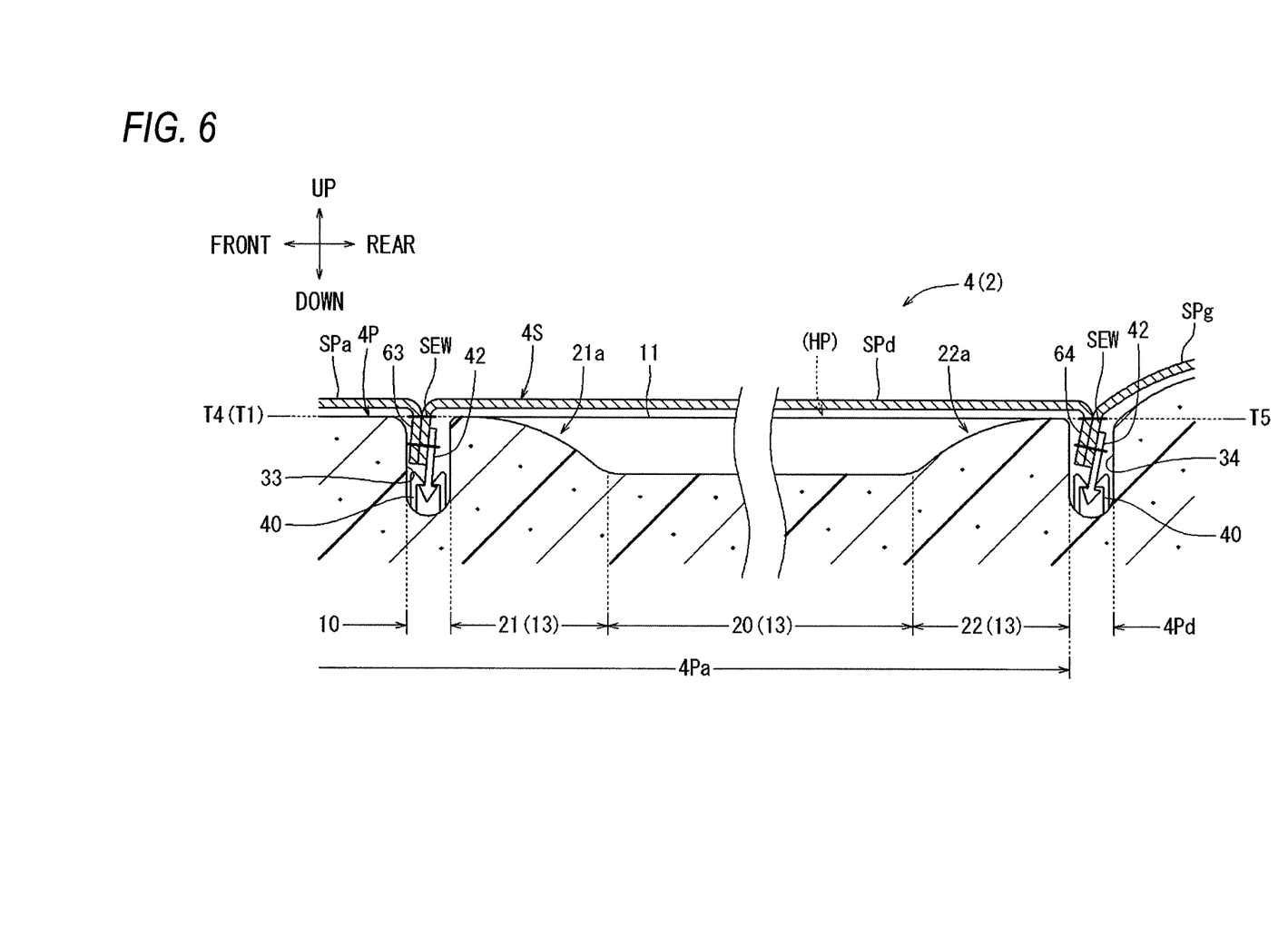
FIG. 6 is a schematic vertical cross-sectional view of a part of the vehicle seat.
Figure 7:
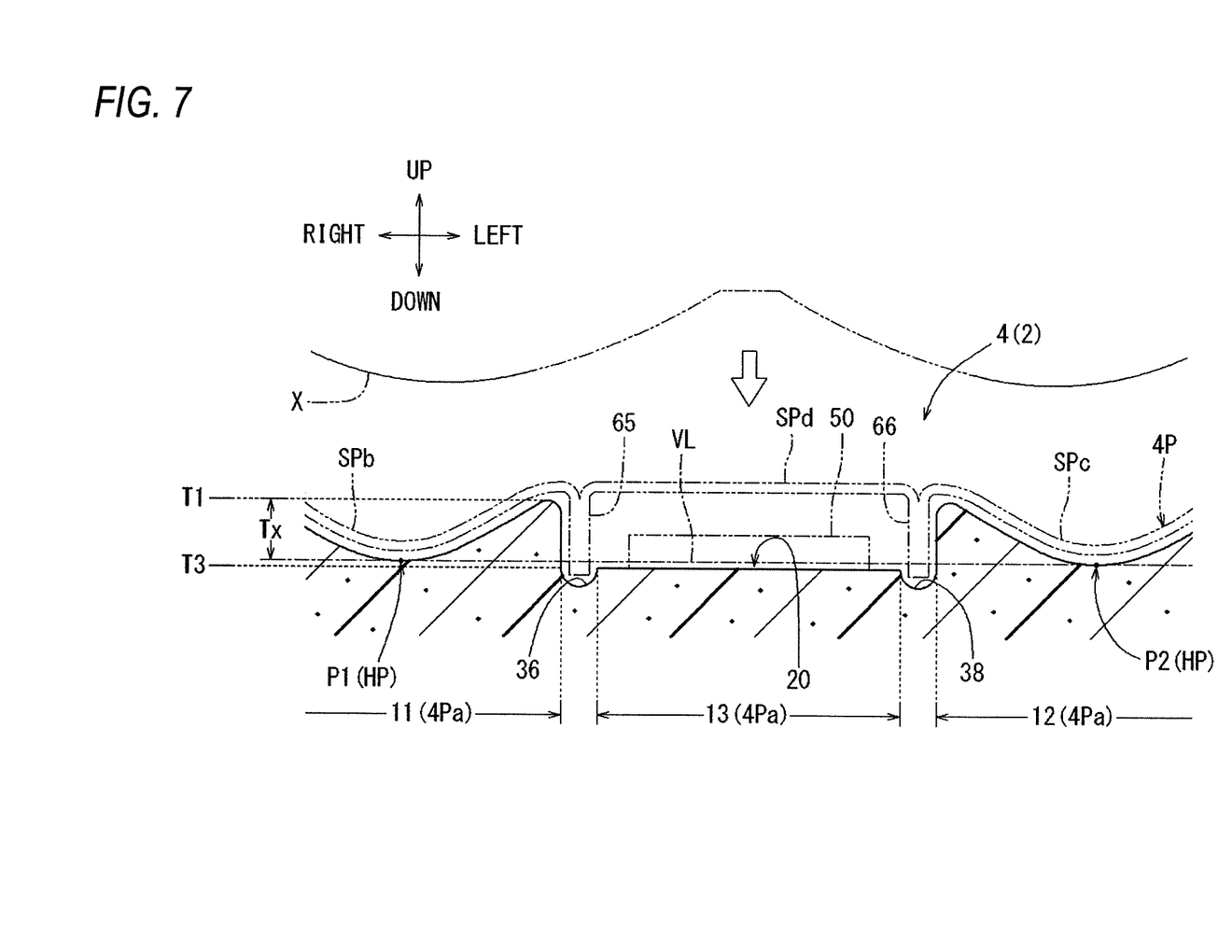
FIG. 7 is a schematic horizontal cross-sectional view of a part of the vehicle seat when an occupant is sitting.

Hereinafter, embodiments for implementing the present disclosure will be described with reference to FIGS. 1 to 7. In each drawing, arrows indicating a front-rear direction, an upper-lower direction, and a left-right direction of a vehicle seat are appropriately illustrated. For convenience, FIG. 3 to FIG. 6 are illustrated with a seat cover floating up from a seat pad, while an actual seat cover is in contact with an upper surface serving as a front surface of a seat cover. In FIG. 7, the seat cover and buttocks of the occupant are illustrated with two-dotted broken line.

Figure 1:
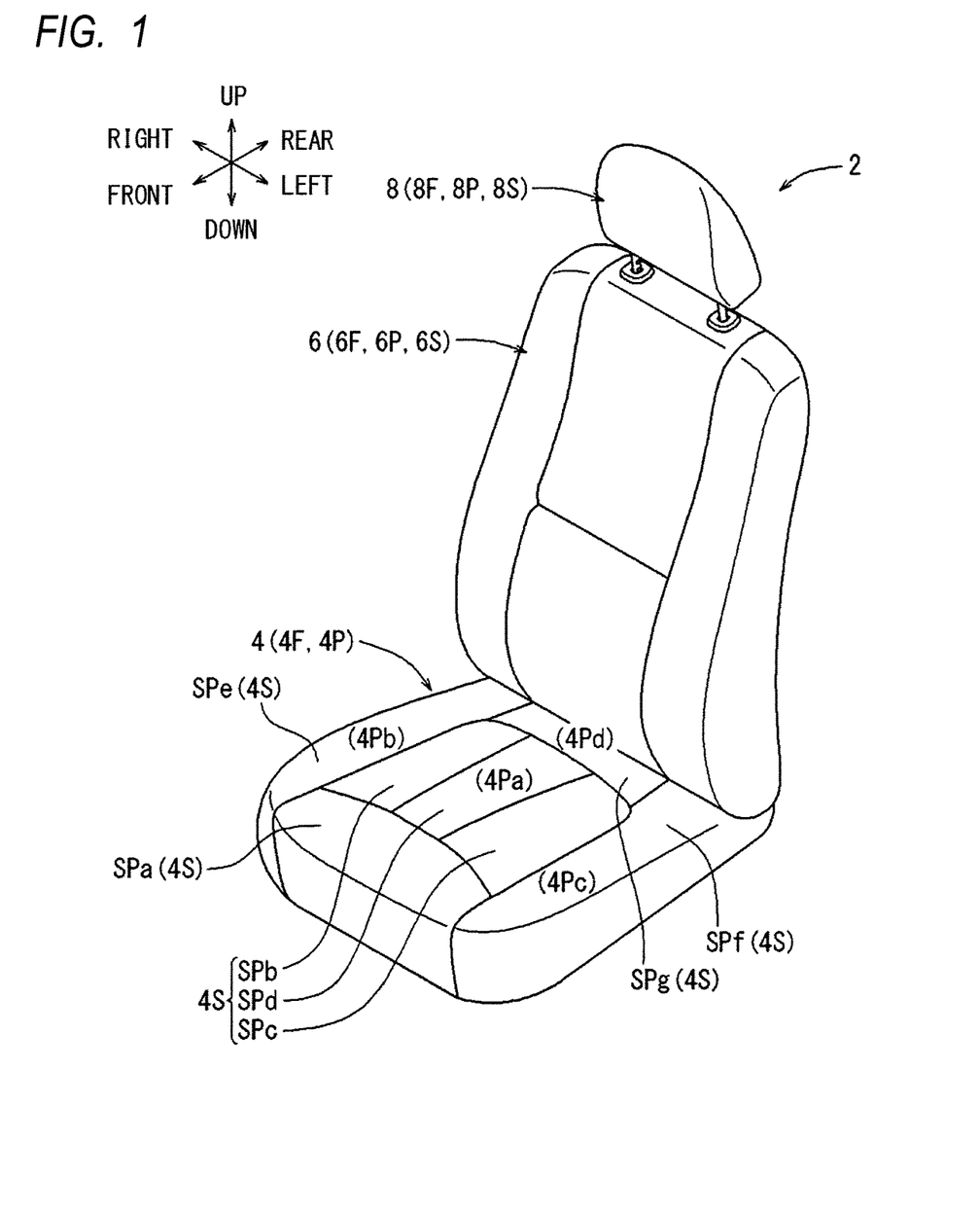
FIG. 1 is a perspective view of a vehicle seat.

A vehicle seat 2 in FIG. 1 includes a seat cushion 4, a seat back 6, and a headrest 8. These seat configuration members (4, 6, 8) respectively include seat frames (4F, 6F, 8F) forming a seat framework, seat pads (4P, 6P, 8P) forming a seat outer shape, and seat covers (4S, 6S, 8S) covering the seat pads. Further, a lower portion of the seat back 6 in a raised state is coupled to a rear portion of the seat cushion 4 (described in detail below) in a manner capable of raising and falling. Also, the headrest 8 is disposed on an upper portion of the seat back 6 in the raised state.

[Seat Cushion]

The seat cushion 4 is a substantially rectangular member in a top view that allows an occupant to seat, which includes the aforementioned basic configurations 4F, 4P, and 4S. In the seat cushion 4, the seat pad 4P (described in detail below) is disposed on the seat frame 4F and covered by the seat cover 4S (described in detail below). Herein, the seat frame 4F (not illustrated) is typically a frame body having a substantially rectangular shape when seen from above, which may be made of a material having excellent rigidity, such as metals and hard resins. A seating portion 4Pa as described below is provided on an upper surface of the seat pad 4P serving as a front surface of the seat pad 4P, and the occupant sits on an appropriate position of this seating portion 4Pa. Such seat configuration is capable of improving performances of the vehicle seat 2 by improving seating performance of the seat pad 4P, etc. In particular, when the occupant sits on the seating portion 4Pa, partial excessive protrusion of the seating portion 4Pa toward the occupant side should be avoided as much as possible from a viewpoint of seating performance improvement of the seat. Then, in the present embodiment, the configuration as described below avoids partial large protrusion of the seating portion 4Pa toward the occupant side as much as possible when the seat pad 4P is pressed by the occupant, so as to improve performances of the vehicle seat 2. Hereinafter, each configuration will be described in detail.

[Seat Pad]

Figure 2:
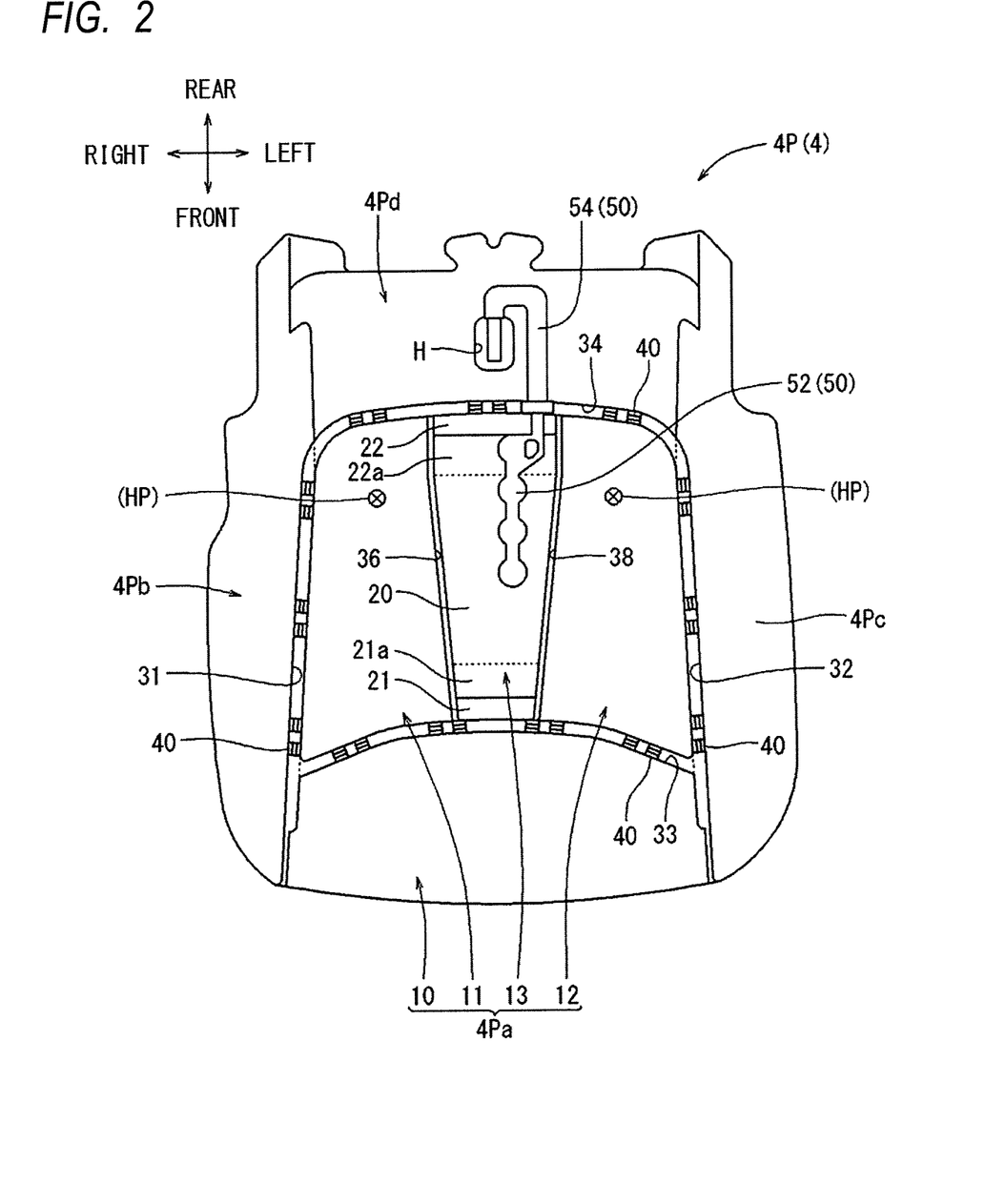
FIG. 2 is a top view of a seat pad.

The seat pad 4P, referring to FIG. 2, is a member having a substantially rectangular shape when seen from above, forming the outer shape of the seat cushion 4. An accessory 50 as described below is attached to the seat pad 4P. Herein, a material of the seat pad 4P is not specifically limited as along as it is capable of elastically supporting the occupant, and examples thereof include foamed resins such as polyurethane foam (density: 10 kg/m$^3$ to 60 kg/m$^3$). The upper surface serving as the front surface of the seat pad 4P can be divided into a seating portion 4Pa, a right side bank portion 4Pb, a left side bank portion 4Pc, and a rear side bank portion 4Pd. Further, a plurality of groove portions (31 to 34, 36, and 38) are provided on the upper surface of the seat pad 4P. Here, the seating portion 4Pa (described in detail below) is a portion formed on the center in the left-right direction that is the seat width direction, which is divided into a plurality of regions (11 to 13) as described below. In addition, the bank portions 4Pb, 4Pc are portions protruding upward relatively on the right and left side of the seating portion 4Pa, which can support the occupant on both lateral sides, e.g., when the vehicle is cornering. The rear side 4Pd is a part located on the rear side of the seating portion 4Pa, which has a substantially rectangular shape with the seat width direction as a longitudinal direction when seen from above. Moreover, this rear side bank portion 4Pd protrudes upward similarly as the left and right bank portions 4Pb, 4Pc, and is set one step higher than the seating portion 4Pa as described below. Also, a front surface side of the rear side bank portion 4Pd is gradually inclined downward as going forward. The right side of the rear side bank portion 4Pd is connected to the rear portion of the right side bank portion 4Pb, and the left side of the rear side bank portion 4Pd is connected to the rear portion of the left side bank portion 4Pc.

[Seating Portion]

The seating portion 4Pa, referring to FIG. 2, extends in the front-rear direction at an appropriate width between the right and the left bank portions 4Pb, 4Pc, and is divided into a front region 10, a first region 11, a second region 12, and a central region 13. The front region 10 is a region constituting a front portion of the seating portion 4Pa, which has a substantially rectangular shape with the seat width direction as a longitudinal direction when seen from above, and further, a surface of the front region 10 is substantially flat. A front edge of the front region 10 extends linearly in the left-right direction, and the rear edge of the front region 10 extends in the left-right direction in an arc shape convexed backward. The first region 11, the second region 12, and the central region 13 are regions constituting parts of the seating portion 4Pa except for the front region 10, which are arranged between the front region 10 and the rear side bank portion 4Pd in the seat front-rear direction.

[First Region and Second Region]

Figure 3:
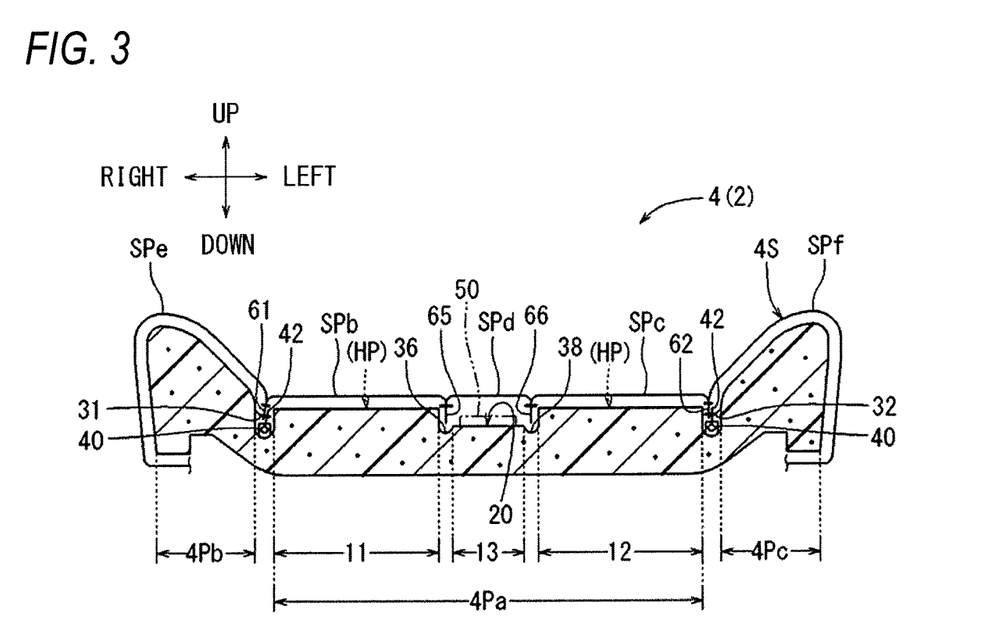
FIG. 3 is a schematic horizontal cross-sectional view of a vehicle seat.
Figure 4:
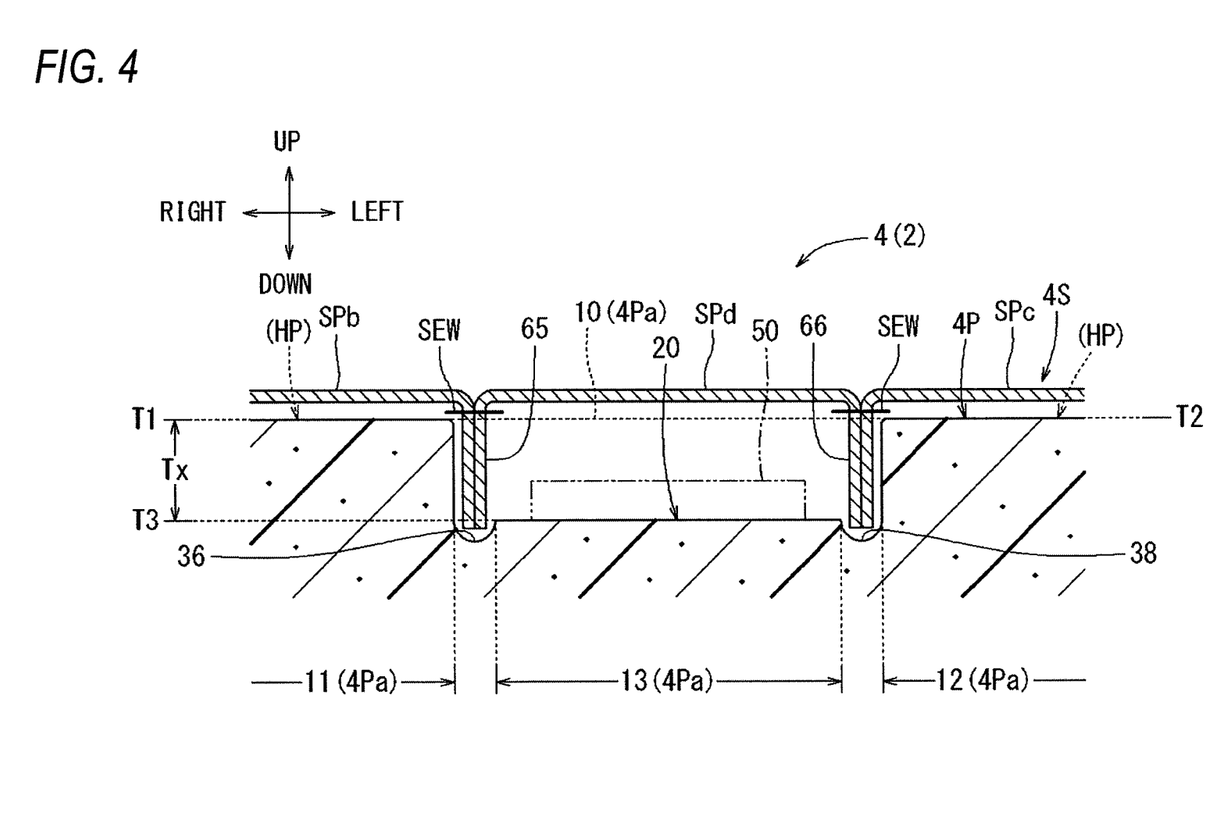
FIG. 4 is a schematic horizontal cross-sectional view of a part of the vehicle seat.

The first region 11 and the second region 12, referring to FIG. 2, are respectively arranged on the left and the right of the seating portion 4Pa in a manner bilaterally symmetrical to each other. The first region 11 is a region having a substantially rectangular shape when seen from above in the front-rear direction as a longitudinal direction, which is arranged on the right side of the seating portion 4Pa, and gradually increases a width toward the left side as going forward. The second region 12 is a region having a substantially rectangular shape when seen from above with the front-rear direction as a longitudinal direction, which is arranged on the left side of the seating portion 4Pa, and gradually increases a width toward the right side as going forward. A rear portion (HP) of the first region 11 and a rear portion (HP) of the second region 12 are parts on which the buttocks of the occupant in the seating state are respectively arranged, and are to be concave-deformed downward (toward a back surface of the seat pad) when pressed by the buttocks of the occupant. Referring to FIG. 3 and FIG. 4, the surface of the first region 11 and the surface of the second region 12 are respectively set substantially flat, extend in the front-rear direction, and are set at substantially the same height position in the upper-lower direction. Namely, with a free state where the seat pad 4P is not pressed as a reference, a height position T1 of the surface of the first region 11 and a height position T2 of the surface of the second region 12 are set at substantially the same as the height position of the surface of the front region 10.

[Central Region]

The central region 13, referring to FIG. 2, is a region arranged between the first region 11 and the second region 12 in the seat width direction. The central region 13 has a concave portion 20, a front side raised portion 21, and a rear side raised portion 22. The central region 13 is a region having a substantially rectangular shape when seen from above with the front-rear direction as a longitudinal direction, which has a width in the left-right direction gradually reduced as going forward. A width of the rear side of the central region 13 in the left-right direction sets shorter than a distance between the rear portion (HP) of the first region 11 and the rear portion (HP) of the second region 12. Thus, the central region 13 is unlikely to be pressed by the buttocks of the occupant, etc. Further, the central region 13 has the same length in the front-rear direction as the first region 11 and the second region 12, and as illustrated in FIG. 5, is arranged between the front region 10 and the rear side bank portion 4Pd.

The concave portion 20, as illustrated in FIG. 2 to FIG. 4, is a portion disposed between the rear portion (HP) of the first region 11 and the rear portion (HP) of the second region 12 in the seat width direction. The concave portion 20, referring to FIG. 3 and FIG. 4, has a shape concaved downward (toward the back surface of the seat pad) as compared to the first region 11 and the second region 12 in the free state (the height position thereof is described in detail below). Namely, in the present embodiment, the concave portion 20 corresponds to "a central region part arranged between the first region and the second region that are to be concave-deformed" of the present disclosure. The surface of the concave portion 20 of the present embodiment is substantially flat, and is one step lower than the first region 11 and the second region 12. The length of the concave portion 20 in front-rear direction, as illustrated in FIG. 2 and FIG. 6, is set capable of receiving the rear portion (HP) of the first region 11 and the rear portion (HP) of the second region 12, and can be appropriately set by considering the front-rear direction size of the buttocks of the occupant.

[Height Position of Central Region]

The height position T3 of the concave portion 20 (the central region part) as illustrated in FIG. 4 can be set by considering the degree of concave of the first region 11 and the second region 12 depending on the physique of the sitting occupant. Namely, as a reference when the occupant is sitting as illustrated in FIG. 7, a virtual line VL is assumed. The virtual line VL extends in the seat width direction so as to connect a position of the first region 11 that is concaved the most (a vertex P1 in FIG. 7) in the first region 11 and a position of the second region 12 that is concaved the most (a vertex P2 in FIG. 7) in the second region. In the central region 13, a position of the concave portion 20 protruding the most toward the front surface of the seat pad when the occupant is sitting can be located at a position the same as the virtual line VL or lower than the virtual line VL. For example, in the present embodiment, the height position T3 of the concave portion 20 as illustrated in FIG. 4 is set lower than the height position T1 of the first region 11 by a predetermined height (Tx). This predetermined height (Tx) is substantially the same as the difference (Tx) between the height position T1 of the first region 11 in the free state and the height position of the position that is concaved the most when the occupant is sitting (the vertex P1) as illustrated in FIG. 7 (in FIG. 7, for convenience, the surface of the central region 13 and the virtual line VL are displaced from each other in the upper-lower direction, but actually overlap each other). In the present embodiment, since the surface of the concave portion 20 is flat, the position protruding the most in the concave portion 20 toward the back surface of the seat pad refers to the entire surface of the concave portion 20. Here, the degree of concave of the first region 11 and the second region 12 can be measured by, e.g., having various occupant models (mannequins) actually sitting thereon. Examples of such type of occupant dummy include an occupant model according to SAE standards, and an occupant model of a size between an AM95 occupant model and a JF05 occupant model.

[Raised Portion of Central Region]

The front side raised portion 21, referring to FIG. 2 and FIG. 6, is a part raised upward as compared to the concave portion 20, and is disposed on a front end of the central region 13. The front side raised portion 21, as illustrated in FIG. 6, has a front edge side extending in the left-right direction that protrudes upward the most, and a height position T4 of the front edge part that protrudes the most is set substantially the same as a height position of the surface of the first region 11 (and a height position of the surface of the second region). A part of the front raised portion 21 from the front edge part of the front raised portion 21 to the concave portion 20 is inclined so as to form an inclined surface 21a. The inclined surface 21a is gradually inclined downward linearly as going backward, and is in a state where a part protruding upward does not occurred substantially. The rear side raised portion 22 is also a part raised upward as compared to the concave portion 20, and is disposed on a rear end of the central region 13. The rear side raised portion 22 has a rear edge side extending in the left-right direction that protrudes upward the most, and a height position T5 of this rear edge part that protrudes the most is set substantially the same as or slightly lower than the height position of the surface of the first region 11 (and the height position of the surface of the second region). A part of the rear raised portion 22 from the rear edge part of the rear raised portion 22 to the concave portion 20 is inclined so as to form an inclined surface 22a. The inclined surface 22a is gradually inclined downward linearly as going forward, and is in a state where a part protruding upward does not occur substantially.

[Groove Portions (Hooking Grooves)]

Referring to FIG. 2, a plurality of groove portions (a first hooking groove 31 to a fourth hooking groove 34, and a pair of left and right divisional grooves 36, 38) are linear concaved positions. Each of the plurality of groove portions is provided on the front surface of the seat pad 4P. Here, each hooking groove 31 to 34 is a groove portion that is capable of locking and holding a part of a seat cover 4S as described below in a retracted manner, and a plurality of or one locking member 40 may be disposed on a bottom surface of each of the hooking grooves 31 to 34 (in FIG. 2, for convenience, a reference sign 40 is given to only some of the locking members). Each locking member 40 is a member having a U-shaped cross section protruding upward from the bottom of the corresponding hooking groove, and is capable of locking and holding a locking portion 42 on the seat cover 4S side by clamping the same as illustrated in FIG. 3 and FIG. 5.

The first hooking groove 31 extends in the front-rear direction between the right side bank portion 4Pb and the seating portion 4Pa (the first region 11), and the second hooking groove 32 extends in the front-rear direction between the left side bank portion 4Pc and the seating portion 4Pa (the second region 12). The third hooking groove 33 is a groove portion crossing the seating portion 4Pa in the left-right direction, and is disposed along the rear end of the front region 10. The third hooking groove 33 is set in a state of being arranged in adjacent to the first region 11, the second region 12, and the front side of the central region 13, and the left and the right end portions of the third hooking groove 33 respectively communicate with the first hooking groove 31 and the second hooking groove 32. The fourth hooking groove 34 is a groove portion extending in the left-right direction along the front edge of the rear side bank portion 4Pd. The fourth hooking groove 34 is set in a state of being arranged in adjacent to the first region 11, the second region 12, and the rear side of the central region 13, and the left and the right end portions of the fourth hooking groove 34 respectively communicate with the rear end of the first hooking groove 31 and the rear end of the second hooking groove 32. In the present embodiment, both the third hooking groove 33 and the fourth hooking groove 34 correspond to the hooking groove of the present disclosure, and are provided adjacent to the front side and the rear side of the first region 11, the second region 12, and the central region 13.

[Divisional Groove Portions (Divisional Portions)]

The pair of left and right divisional groove portions 36, 38 are groove portions extending in the front-rear direction inside the seating portion 4Pa, in which a part of the seat cover 4S can be arranged. The left and right divisional groove portions 36, 38 are groove portions corresponding to the divisional portions of the present disclosure, and partition regions adjacent to one another. Namely, the right side divisional groove portion 36 is a groove portion extending in the front-rear direction so as to divide the first region 11 and the central region 13, and is concaved closer to the inside than the surface of the central region 13. Further, the left side divisional groove portion 38 is a groove portion extending in the front-rear direction so as to divide the second region 12 and the central region 13, and is concaved closer to the back surface of the seat pad than the surface of the central region 13. The depth of the pair of left and right divisional groove portions 36, 38 is set such that a sewing margin as described below, that is a part of the seat cover 4S, is arranged in a state where the seat pad 4P is covered by the seat cover 4S.

[Accessory]

An accessory 50, referring to FIG. 2, is a planar member having a sensor function that is capable of, for example, sensing the occupant. The accessory 50 may be arranged between the seat pad 4P and the seat cover 4S as illustrated in FIG. 3. The accessory 50, referring to FIG. 2, has a planar main body portion 52 and a belt-shaped connecting portion 54. In the present embodiment, the main body portion 52 of the accessory 50 is disposed on the concave portion 20 of the central region 13, and is arranged between the rear portion (HP) of the first region 11 and the rear portion (HP) of the second region 12. By arranging the main body portion 52 of the accessory 50 on the concave portion 20 in this way, a problem that this main body portion 52 projects to the seat cover 4S side (highlights occur) can be avoided as much as possible. Further, the connecting portion 54 extends backward from the rear end of the main body portion 52 in a manner passing above the fourth hooking groove 34 and being retracted into a through hole H of the rear side bank portion 4Pd, and then is connected to a control unit on the inside of the seat cushion 4, which is not illustrated.

[Seat Cover]

The seat cover 4S, referring to FIG. 1, is a surface material covering the seat pad 4P and constituting the design surface, which has a plurality of cover pieces (SPa to SPg), and a plurality of sewn portions 61 to 66 and a locking portion 42 as described below. Here, examples of the materials of each cover piece include cloth (woven fabric, knitted fabric, non-woven fabric) and leather (natural leather, synthetic leather), and a pad material such as a urethane lamination or an inside base cloth such as a nonwoven fabric (not illustrated) can be appropriately attached to an back surface of each cover piece. The seating portion 4Pa, referring to FIG. 3 and FIG. 5, is covered by a front cover piece SPa, a right cover piece SPb, a left cover piece SPc, and a central cover piece SPd. The front cover piece SPa is covered by the front region 10, the right cover piece SPb is covered by the first region 11, the left cover piece SPc is covered by the second region 12, and the central cover piece SPd is covered by the central region 13. Further, the right side bank portion 4Pb is covered by a right bank cover piece SPe, the left side bank portion 4Pc is covered by a left bank cover piece SPf, and the rear side bank portion 4Pd is covered by a rear bank cover piece SPg.

Here, referring to FIG. 4 and FIG. 6, the cover pieces adjacent to each other are sewn to each other with the sewing lines SEW, and each cover piece is unfolded in a planar shape with each sewing line SEW as a base point. Between the adjacent cover pieces, positions at which the sewing margin are sewn in a state of being folded inwardly (a first sewn portion 61 to a sixth sewn portion 66) are formed. Each of the sewn portions 61 to 66, in a state where the seat cover 4S covers the seat pad 4P, is arranged in a manner forming a part of the seat cover 4S and protruding to the seat pad 4P side. For example, referring to FIG. 3, the first sewn portion 61 is a position at which the left edge of the right bank cover piece SPe and the right edge of the right cover piece SPb are sewn together. The first sewn portion 61 extends in the front-rear direction along the first hooking groove 31. The second sewn portion 62 is a position at which the right edge of the left bank cover piece SPf and the left edge of the left cover piece SPc are sewn together. The second sewn portion 62 extends in the front-rear direction along the second hooking groove 32. A plate-shaped locking portion 42 is sewn and attached to each of the first sewn portion 61 and the second sewn portion 62, and an arrowhead-shaped tip end of the locking portion 42 can be locked and held by the locking member 40 of the corresponding hooking grooves 31, 32.

Referring to FIG. 1, FIG. 5, and FIG. 6, the third sewn portion 63 is a position at which the rear edge of the front cover piece SPa and each front edge of each cover piece SPb, SPc, SPd arranged on the rear side thereof are sewn together. The third sewn portion 63 extends in the left-right direction along the third hooking groove 33. The fourth sewn portion 64 is a position at which the front edge of the rear bank cover piece SPg and each rear edge of each cover piece SPb, SPc, SPd arranged on the front side thereof are sewn together. The fourth sewn portion 64 extends in the left-right direction along the fourth hooking groove 34. A plate-shaped locking portion 42 is sewn and attached to each of the third sewn portion 63 and the fourth sewn portion 64, and the arrowhead-shaped tip end of this locking portion 42 can be locked and held by the locking member 40 of the corresponding hooking grooves 33, 34.

Referring to FIG. 3 and FIG. 4, the fifth sewn portion 65 is a position at which the left edge of the right cover piece SPb and the right edge of the central cover piece SPd are sewn together. The fifth sewn portion 65 extends in the front-rear direction along the right side divisional groove portion 36. The sixth sewn portion 66 is a position at which the right edge of the left cover piece SPc and the left edge of the central cover piece SPd are sewn together. The sixth sewn portion 66 extends in the front-rear direction along the left side divisional groove portion 38. The fifth sewn portion 65 or the sixth sewn portion 66 can be arranged alone inside the corresponding divisional groove portions 36, 38, without a locking portion attached thereto.

[Covering Operation of Seat Pad by Seat Cover]

Referring to FIG. 3 to FIG. 6, the seat cover 4S covers the seat pad 4P, and each sewn portion 61 to 66 that is a part of the seat cover 4S is locked or arranged inside the corresponding groove portions 31 to 34, 36, 38. At this time, referring to FIG. 4, each of the fifth sixth 65 and the sixth sewn portion 66 is simply arranged inside the corresponding divisional groove portions 36, 38, without a locking portion attached thereto. In contrast, the first sewn portion 61 to the fourth sewn portion 64, as illustrated in FIG. 3 and FIG. 5, are locked and held in a state retracted into the corresponding hooking grooves 31 to 34. Namely, referring to FIG. 3, a locking portion 42 is attached to each of the first sewn portion 61 and the second sewn portion 62 that are retracted downward, and the locking portion 42 is locked and held by the locking member 40 of the corresponding hooking grooves 31, 32.

Referring to FIG. 6, a locking portion 42 is attached to the third sewn portion 63 that is retracted downward, and this locking portion 42 is locked and held by the locking member 40 of the third hooking groove 33. The front cover piece SPa and the central cover piece SPd, etc. are unfolded in a planar shape with the third sewn portion 63 as a base point, while at this time, the front side of the central cover piece SPd is arranged on the central region 13 which is set to a concaved shape, and thus may be slackened downward. Similarly, a locking portion 42 is attached to the fourth sewn portion 64 that is retracted downward, and this locking portion 42 is locked and held by the locking member 40 of the fourth hooking groove 34. The central cover piece SPd, etc. and the rear bank cover piece Spg are unfolded in a planar shape with the fourth sewn portion 64 as a base point, while at this time, the rear side of the central cover piece SPd is arranged on the central region 13 which is set to a concaved shape, and thus may be slackened downward.

In the present embodiment, referring to FIG. 6, the front side raised portion 21 protruding upward is provided on the front end of the central region 13, and the front side raised portion 21 supports the front side of the central cover piece SPd from the lower side. Similarly, the rear side raised portion 22 protruding upward is provided on the rear end of the central region 13 as well, and the rear side raised portion 22 supports the rear side of the central cover piece SPd from the lower side. Therefore, according to the present embodiment, occurrence of unintended slack of the central cover piece SPd can be avoided or reduced, which enables arrangement of the seat cover 4S in a better appearance. Further, in the present embodiment, the rear side of the front raised portion 21 is inclined so as to form the inclined surface 21a, and the front side of the rear raised portion 22 is inclined so as to form the inclined surface 22a. A part protruding upward substantially does not occur at each inclined surface 21a, 22a. Therefore, it is possible to avoid a problem that unevenness (highlights) of the seat pad 4P projects to the seat cover 4S as much as possible, and to avoid occurrence of foreign body sensation due to unevenness occurring on unintended positions as much as possible.

[Behavior of Seat Pad when Occupant is Sitting]

Referring to FIG. 7, when the occupant sits on the seat cushion 4, a part of the seating portion 4Pa of the seat pad 4P is pressed by the occupant and is bending and deformed downward (toward the back surface of the seat pad). Namely, in the present embodiment, when pressed by the occupant buttocks X, both the first region 11 and the second region 12 are concave-deformed and support the occupant buttocks X. At this time, the first region 11 and the second region 12 are respectively divided from the central region 13 by the corresponding divisional groove portions 36, 38. Therefore, when the occupant is sitting, the first region 11 and the second region 12 is concave-deformed while smoothly bending in a manner substantially independent from the central region 13 (being hindered as little as possible).

In the aforementioned seat configuration, when the occupant sits on the seating portion 4Pa, partial excessive protrusion of this seating portion 4Pa toward the occupant side should be avoided as much as possible. In particular, in the present embodiment, as described above, the first region 11 and the second region 12 are divided from the central region 13 and thus are likely to be concave-deformed. However, such configuration leads to a result that the central region 13 is likely to protrude without following concave deformation of the first region 11 and the second region 12. Then, in the present embodiment, referring to FIG. 4 and FIG. 6, the concave portion 20 is provided on the central region 13, and the concave portion 20 is arranged between the rear portion (HP) of the first region 11 and the rear portion (HP) of the second region 12 which are to be concave-deformed. The concaved portion 20 has a shape concaved toward the rear side as compared to the first region 11 and the second region 12. Therefore, when the seat pad 4P is pressed by the occupant, relative protrusion of the concave portion 20 is suppressed due to such concaved shape, and thus partial excessive protrusion of the seating portion 4Pa toward the occupant can be avoided as much as possible.

In particular, in the present embodiment, by adjusting the height position T3 of the concave portion 20 of the central region 13 as illustrated in FIG. 4, partial excessive protrusion of the seating portion 4Pa toward the occupant is avoided more securely. Namely, as illustrated in FIG. 7, the rear portion (HP) of the first region 11 and the rear portion (HP) of the second region 12 are bending and deformed downward when pressed by the occupant buttocks X. At this time, the rear portion (HP) of the first region 11 is concave-deformed in a manner curved downward, with the vertex P1 of the curved part arranged at a lowest position in the first region 11. Similarly, the rear portion (HP) of the second region 12 is concave-deformed in a manner curved downward, with the vertex P2 of the curved part arranged at a lowest position in the second region 12. Then, the virtual line VL extending in the seat width direction so as to connect the vertex P1 of the first region 11 that is concaved the most in the first region 11 and the vertex P2 of the second region 12 that is concaved the most in the second region 12 is set. In the central region 13, a position of the concave portion 20 protruding the most toward the front surface of the seat pad when the occupant is sitting can be located at a position the same as the virtual line VL or lower (closer to the back surface of the seat pad) than the virtual line VL. Therefore, in the present embodiment, the central region 13 does not protrude to the occupant side more than the first region 11 and the second region 12, and thus partial excessive protrusion of the seating portion 4Pa toward the occupant can be avoided more securely. In particular, by setting the position of the concave portion 20 protruding the most toward the front surface of the seat pad at a position the same as the virtual line VL, it is possible to suitably avoid occurrence of uncomfortable feeling of the sitting occupant.

In the present embodiment as described above, the central region 13 is set between the first region 11 and the second region 12, and is relatively concaved toward the back surface of the seat pad. When the seat pad 4P is pressed by the occupant, relative protrusion of the central region 13 is suppressed due to such concaved shape, and thus partial excessive protrusion of the seating portion 4Pa toward the occupant can be avoided as much as possible. In particular, in the present embodiment, when the seat pad 4P is pressed by the occupant, the central region 13 does not protrude to the occupant side more than the first region 11 and the second region 12 (the virtual line VL), and thus partial excessive protrusion of the seating portion 4Pa toward the occupant can be avoided more securely. In addition, in the present embodiment, the adjacent regions 11, 13 (12, 13) are partitioned by the divisional groove portion 36 (38). Therefore, in the present embodiment, when the occupant is sitting, etc., it is possible to prevent behavior of a specific region from affecting other regions, and to appropriately exhibit predetermined performances of each region. In addition, in the present embodiment, by raising up suitable positions in the central region 13, the seat cover can be supported by such raised parts (21, 22) from the back surface side of the seat cover, which is a configuration contributing to improvement of seat performances such as design. In addition, in the present embodiment, suitable positions of the central region 13 are set to the inclined surfaces (21a, 22a) so as to avoid occurrence of partial protrusion, which is a configuration contributing to improvement of seat performances such as seating performance and design. Further, in the present embodiment, when the accessory 50 is disposed on the vehicle seat 2 for the purpose of performance improvement, this accessory 50 is disposed on the surface of the concaved central region part (the concave portion 20). Thereby, a problem that the accessory 50 projects to the seat cover 4S side (highlights occur) can be avoided as much as possible, which enables further improvement of design of the vehicle seat 2. Therefore, according to the present embodiment, it is possible to improve performances of the vehicle seat, while avoiding partial excessive protrusion of the seating portion 4Pa toward the occupant as much as possible when the seat pad 4P is pressed by the occupant.

The vehicle seat 2 of the present embodiment is not limited to the above embodiment, and various other embodiments may be adopted. In the present embodiment, the configuration (shape, dimension, arrangement relationship, height position of surface, etc.) of each region 10 to 13 of the seating portion 4Pa is exemplified, but it is not intended to limit the configuration of each region. For example, the height positions of the front region, the first region, and the second region may be either the same to or different from one another. The first region and the second region may be either bilaterally symmetrical or bilaterally asymmetrical. The seating portion is not limited as long as it has the first region, the second region, and the central region, while the front region may be omitted, and another region may be formed on the rear side or lateral side of the first region, the second region, and the central region. The surface of each region may have some unevenness disposed thereon as long as it does not deteriorate seating performance.

In the case where the surface of the central region is uneven, the relationship between the central region and the virtual line may be defined with a convex portion protruding the most as a reference. The central region may be located lower than the virtual line when the seat pad is pressed by the occupant, where a gap is generated between the seat cover and the central region so as to allow air to flow (which is a configuration contributing to air permeability improvement). The central region may also protrude higher than the virtual line when the seat pad is pressed by the occupant, as long as it does not deteriorate seating performance. The central region may have a length in the front-rear direction different from the first region and the second region.

The first region, the second region, and the central region may be divided and partitioned by notch-like divisional portions, and such divisional portions may be omitted. A plurality of or one hooking groove may be provided adjacent to the first region, the second region, and the central region. The plurality of or one hooking groove may also be configured such that the plurality of or one hooking groove is not provided adjacent to the first region, the second region, and the central region. The central region may have a plurality of or one raised portion disposed depending on the number of adjacent hooking grooves, and such raised portions may be omitted as well. The height position of the raised portions may be set higher than the first region or the second region, in which case the raised portions can be previously crushed when pressed by the seat cover. The surface of the central region from an end portion on the hooking groove side to the concave portion of the central region may be either an inclined surface or a curved surface, or a step-shaped surface. Examples of a method for locking and holding a part of the seat cover and the hooking grooves include various methods such as hog ring locking.

In this embodiment, although the configuration of the vehicle seat 2 is exemplified, the configuration of the vehicle seat can be appropriately changed. For example, an example having the accessory 50 disposed on the vehicle seat 2 is described, where examples of such accessory include a surface material having a function as a heater and a sensor, etc. The entire accessory may be disposed on the concave portion of the central region. The vehicle seat can also omit the accessory. In the present embodiment, the seat cushion 4 is described as an example, while the configuration of the present embodiment can be applied to various seat configuration members such as a seat back. In the seat back, a seating portion is disposed on a seat pad so as to allow seating of an occupant (backrest). In this seating portion, a first region and a second region are disposed on a seat pad part pressed by scapulae of the occupant, and a central region is relatively concaved backward (toward a back surface of the seat pad). The configuration of the present embodiment can be applied to vehicle seats of vehicles, aircrafts, trains, ships, etc. in general.

The disclosure provides illustrative, non-limiting examples as follows:

A first aspect of the present disclosure is a vehicle seat including: a seat pad capable of elastically supporting an occupant, the seat pad having a seating portion that allows the occupant to seat on a front surface thereof, and the seating portion is divided in a seat width direction into a first region, a second region, and a central region formed between the first region and the second region, both the first region and the second region being capable of being concave-deformed toward a back surface of the seat pad opposite to the front surface when pressed by the occupant in a seating state, and in a free state where the seating portion is not pressed, a central region part in the central region arranged between the first region and the second region that are to be concave-deformed has a shape concaved toward the back surface of the seat pad as compared to the first region and the second region. According to such seat configuration, it is possible to avoid partial excessive protrusion of the seating portion toward an occupant as much as possible when a seat pad is pressed by the occupant, so as to improve performances of a vehicle seat. The central region is set between the first region and the second region, and is relatively concaved toward the back surface of the seat pad. When the seat pad is pressed by the occupant, relative protrusion of the central region is suppressed due to such concaved shape, and thus partial excessive protrusion of the seating portion toward the occupant can be avoided as much as possible.

A second aspect of the present disclosure is characterized in that in the first aspect, in a state where the seat pad is pressed by the occupant, assuming a virtual line that extends in the seat width direction and connects positions of the first region and the second region where each of the positions of the first region and the second region is concaved the most in each of the first region and the second region, the central region part is located at a position the same as the virtual line or closer to the back surface of the seat pad than the virtual line. When the seat pad is pressed by the occupant, the central region does not protrude to the occupant side more than the first region and the second region, and thus partial excessive protrusion of the seating portion toward the occupant can be avoided more securely.

A third aspect of the present disclosure is characterized in that in the first aspect, in a state where the seat pad is pressed by the occupant, the central region part is located at a closest position of the seating portion to the back surface of the seat pad.

A fourth aspect of the present disclosure is characterized in that in any one of the first to the third aspect, the first region, the second region, and the central region are divided and partitioned by a groove-shaped divisional portion or a notch-shaped divisional portion provided on the front surface of the seat pad. In the present disclosure, adjacent regions are partitioned by the divisional portions. Therefore, in the present disclosure, when the occupant is sitting, etc., it is possible to prevent behavior of a specific region from affecting other regions, and to appropriately exhibit predetermined performances of each region.

A fifth aspect of the present disclosure is characterized in that in any one of the first to the fourth aspect, the vehicle seat includes a seat cover covering the seat pad, and a part of the seat cover is locked and held in a manner retracted into a hooking groove extending in the seat width direction on the front surface of the seat pad, and in the hooking groove is provided adjacent to at least one of a front side of the first region, the second region, and the central region, and a rear side of the first region, the second region, and the central region, and an end portion of the central region on the hooking groove side is raised closer to the seat cover side than the central region part. In the present disclosure, by raising up a suitable position in the central region, the seat cover can be supported by such raised part from the inside, which is a configuration contributing to improvement of seat performances such as design.

A sixth aspect of the present disclosure is characterized in that in the fifth aspect, the hooking groove is provided adjacent to both the front side and the rear side of the first region, the second region, and the central region.

A seventh aspect of the present disclosure is characterized in that in the fifth or sixth aspect, a surface of the end portion of the central region on the hooking groove side is inclined or curved. In the present disclosure, a suitable position of the central region is set to an inclined surface or a curved surface so as to avoid occurrence of partial protrusion, which is a configuration contributing to improvement of seat performances such as seating performance and design.

An eighth aspect of the present disclosure is characterized in that in any one of the first to seventh aspect, the vehicle seat includes a seat cover covering the seat pad and an accessory disposed between the seat cover and the seat pad, and at least a part of the accessory is disposed on a surface of the central region part. In the present disclosure, when an accessory is disposed on the vehicle seat for the purpose of performance improvement, a part of or the entire accessory is disposed on the concaved central region part. Thereby, a problem that the accessory projects to the seat cover side (highlights occur) can be avoided as much as possible, which enables further improvement of design of the vehicle seat.

According to the first aspect of the present disclosure, it is possible to avoid partial excessive protrusion of the seating portion toward an occupant as much as possible when a seat pad is pressed by the occupant, so as to improve performances of a vehicle seat. According to the second and the third aspect of the present disclosure, it is possible to avoid partial excessive protrusion of the seating portion toward the occupant more securely. According to the fourth aspect of the present disclosure, performances of the vehicle seat can be further improved. According to the fifth and the sixth aspect of the present disclosure, design of the vehicle seat can be improved. According to the seventh aspect of the present disclosure, design and seating performance of the vehicle seat can be improved. According to the eighth aspect of the present disclosure, design of the vehicle seat can be further improved.

What is claimed is:

1. A vehicle seat comprising:
a seat pad capable of elastically supporting an occupant, the seat pad having:
a pair of side bank portions that is disposed at an outer side of the seat pad in a seat width direction; and
a seating portion that is disposed between the pair of side bank portions and allows the occupant to seat on a front surface thereof; and
a seat cover covering the seat pad,
wherein a part of the seat cover is locked and held in a manner retracted into a first hooking groove extending in a front-rear direction on the front surface of the seat pad, the first hooking groove being disposed between the pair of side bank portions and the seating portion,
wherein the seating portion is divided in the seat width direction into a first region, a second region, and a central region formed between the first region and the second region, both the first region and the second region being capable of being concave-deformed toward a back surface of the seat pad opposite to the front surface when pressed by the occupant in a seating state,
wherein the first region, the second region, and the central region are divided and partitioned by a groove-shaped divisional portion or a notch-shaped divisional portion provided on the front surface of the seat pad, and
wherein in a free state where the seating portion is not pressed, a central region part in the central region arranged between the first region and the second region that are to be concave-deformed has a shape concaved toward the back surface of the seat pad as compared to the first region and the second region.

2. The vehicle seat according to claim 1,
wherein in a state where the seat pad is pressed by the occupant, assuming a virtual line that extends in the seat width direction and connects positions of the first region and the second region where each of the positions of the first region and the second region is concaved the most in each of the first region and the second region, the central region part is located at a position the same as the virtual line or closer to the back surface of the seat pad than the virtual line.

3. The vehicle seat according to claim 1,
wherein in a state where the seat pad is pressed by the occupant, the central region part is located at a closest position of the seating portion to the back surface of the seat pad.

4. The vehicle seat according to claim 1,
an accessory disposed between the seat cover and the seat pad,
wherein at least a part of the accessory is disposed on a surface of the central region part.

5. The vehicle seat according to claim 1,
wherein a part of the seat cover is locked and held in a manner retracted into a second hooking groove extending in the seat width direction on the front surface of the seat pad,
wherein the second hooking groove is provided adjacent to at least one of a front side of the first region, the second region, and the central region, and a rear side of the first region, the second region, and the central region, and
wherein an end portion of the central region on the second hooking groove side is raised closer to the seat cover side than the central region part.

6. The vehicle seat according to claim 5,
wherein the second hooking groove is provided adjacent to both the front side and the rear side of the first region, the second region, and the central region.

7. The vehicle seat according to claim 5,
wherein a surface of the end portion of the central region on the second hooking groove side is inclined or curved.

8. A vehicle seat comprising:
a seat pad capable of elastically supporting an occupant, the seat pad having a seating portion that allows the occupant to seat on a front surface thereof; and a seat cover covering the seat pad,
wherein the seating portion is divided in a seat width direction into a first region, a second region, and a central region formed between the first region and the second region, both the first region and the second region being capable of being concave-deformed toward a back surface of the seat pad opposite to the front surface when pressed by the occupant in a seating state, wherein in a free state where the seating portion is not pressed, a central region part in the central region arranged between the first region and the second region that are to be concave-deformed has a shape concaved toward the back surface of the seat pad as compared to the first region and the second region, wherein a part of the seat cover is locked and held in a manner retracted into a hooking groove extending in the seat width direction on the front surface of the seat pad, wherein the hooking groove is provided adjacent to at least one of a front side of the first region, the second region, and the central region, and a rear side of the first region, the second region, and the central region, and wherein an end portion of the central region on the hooking groove side is raised closer to the seat cover side than the central region part.

9. A vehicle seat comprising:

a seat pad capable of elastically supporting an occupant, the seat pad having a seating portion that allows the occupant to seat on a front surface thereof, wherein the seating portion is divided in a seat width direction into a first region, a second region, and a central region formed between the first region and the second region, both the first region and the second region being capable of being concave-deformed toward a back surface of the seat pad opposite to the front surface when pressed by the occupant in a seating state, and wherein in a free state where the seating portion is not pressed, a central region part in the central region arranged between the first region and the second region that are to be concave-deformed has a shape concaved toward the back surface of the seat pad as compared to the first region and the second region, wherein in a state where the seat pad is pressed by the occupant, assuming a virtual line that extends in the seat width direction and connects positions of the first region and the second region where each of the positions of the first region and the second region is concaved the most in each of the first region and the second region, the central region part is located at a position the same as the virtual line or closer to the back surface of the seat pad than the virtual line.

* * * * *